United States Patent
Lisobee et al.

(10) Patent No.: US 10,152,558 B2
(45) Date of Patent: Dec. 11, 2018

(54) GRAPH OPERATIONS

(71) Applicant: Intel Corporation, Santa Clara, CA (US)

(72) Inventors: Todd Lisobee, Hillsboro, OR (US);
Soila P. Kavulya, Beaverton, OR (US);
Bryn Keller, Vancouver, WA (US);
Briton L. Barker, Hillsboro, OR (US);
Kushal Datta, Beaverton, OR (US);
Xia Zhu, Beaverton, OR (US);
Theodore L. Willke, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 395 days.

(21) Appl. No.: 14/581,964

(22) Filed: Dec. 23, 2014

(65) Prior Publication Data
US 2016/0179887 A1    Jun. 23, 2016

(51) Int. Cl.
*G06F 17/30* (2006.01)

(52) U.S. Cl.
CPC .............................. *G06F 17/30958* (2013.01)

(58) Field of Classification Search
None
See application file for complete search history.

(56) References Cited

U.S. PATENT DOCUMENTS

| | | | |
|---|---|---|---|
| 7,461,057 B2 | 12/2008 | Radestock et al. | |
| 2009/0240682 A1* | 9/2009 | Balmin | G06F 17/30554 |
| 2010/0241644 A1 | 9/2010 | Jackson et al. | |
| 2011/0302151 A1 | 12/2011 | Abadi et al. | |
| 2012/0016901 A1* | 1/2012 | Agarwal | G06F 17/30569 707/769 |
| 2012/0054173 A1* | 3/2012 | Andrade | G06F 17/30516 707/714 |
| 2013/0103725 A1 | 4/2013 | Wee et al. | |
| 2014/0172810 A1 | 6/2014 | Paradies et al. | |
| 2014/0172914 A1 | 6/2014 | Elnikety et al. | |
| 2014/0244687 A1 | 8/2014 | Shmueli et al. | |
| 2015/0095182 A1* | 4/2015 | Zhou | H04N 21/4668 705/26.7 |

OTHER PUBLICATIONS

International Search Report, PCT Application No. PCT/US2015/054414, dated Feb. 3, 2016, 4 pages.
Supplementary European Search Report for European Patent Application EP15873864 with a completion date of Apr. 27, 2018, 3 pages.

* cited by examiner

*Primary Examiner* — Grace Park
*Assistant Examiner* — Aida Z Tessema
(74) *Attorney, Agent, or Firm* — International IP Law Group, P.L.L.C.

(57) ABSTRACT

A system and method for orchestrating a table operation of data with a graph operation of the data using columnar stores. The orchestration includes storing vertices and edges as collections of tables by type, and supporting the columnar stores with different storage characteristics. The techniques may also include a graph query optimizer that combines chained operators of a graph query; and/or the graph query executed via an in-memory distributed query execution engine.

25 Claims, 5 Drawing Sheets

200

500

GRAPH OPERATIONS

TECHNICAL FIELD

The present techniques relate generally to graph operations. More particularly, the present techniques relate to orchestration of graph operations with table operations, and in certain instances, to graph query optimization and execution.

BACKGROUND

The competitive business of data and computing services drives manufacturers in the continuous improvement of their processes and products in order to lower production costs, deliver reliable service, and improve user experience. Such may be especially challenging in the "Big Data" era. Big Data is a term used to describe the exponential growth and availability of data, both structured and unstructured. Big Data may be a term for collection of data sets so large and complex that processing is difficult using traditional data processing applications. Big Data may also mean that the amount or size of data is larger than the memory capacity or storage capacity of a single machine and, hence, multiple machines/servers/computers are used to process the data or solve the problem. With the advent of Big Data, challenges include analysis, capture, curation, search, sharing, storage, transfer, visualization, and so on. Again, there exists a need for continuous improvement in efficiency of data storage and processing, and user experience with respect to data handling, including with regard to large amounts of data such as Big Data and data system configurations generally.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
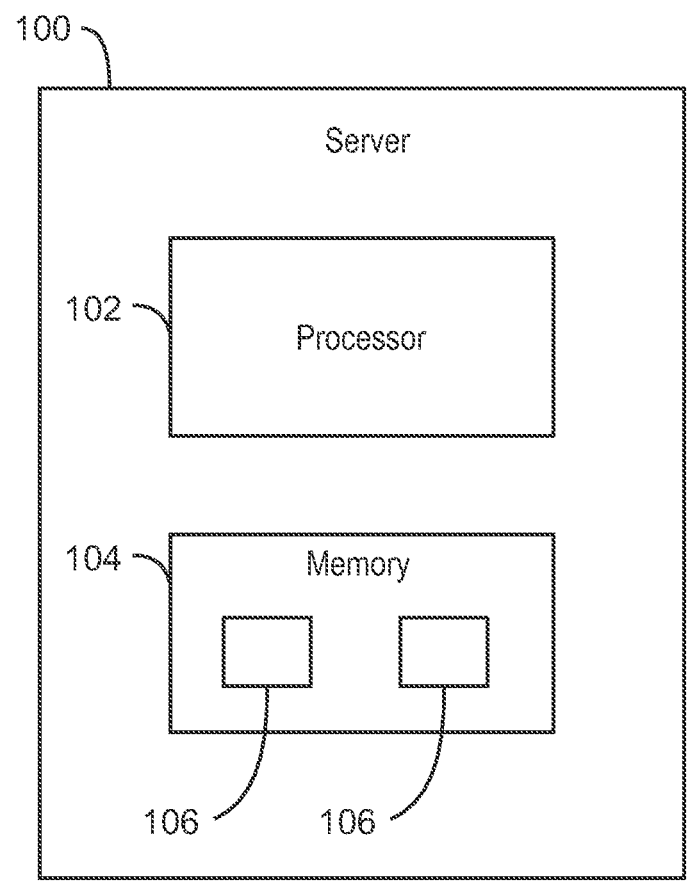
FIG. 1 is a diagram of an apparatus for processing data in accordance with embodiments of the present techniques.

Embodiments of the present techniques provide for orchestration of graphs with tables, i.e., a graph/table orchestration. A relatively seamless graph/table interface may be provided. Indeed, a user may be able to operate on the same data as either a graph or a table. Users may benefit from a seamless or substantially seamless experience between graphs and tables in data storage and handling. For instance, the user may desire the capability to perform table-like operations on graphs, or to evaluate a dataset as a graph one minute and a table the next minute, without import or export between storage systems. Embodiments herein facilitate such an interaction by employing columnar stores, utilizing more than one table for vertices and more than one table for edges, and accommodating multiple distributed execution engines. Further, certain embodiments avoid proprietary solutions and, thus, add flexibility and more seamless orchestration.

Unfortunately, conventional solutions supporting graph and table operations, such as GraphLab or GraphLab Create™, and SAP HANA®, rely on proprietary platforms. Proprietary platforms, such as GraphLab, generally cannot be readily supported by off-the-shelf columnar stores such as Parquet and Cassandra. Further, SAP HANA®, for example, uses a single table for vertices and a single table for edges, and also does not support a variety of columnar stores. Similarly, GraphX™ which is a general graph processing engine, for example, uses single vertex and edge lists for processing, and also does not include a storage format natively. As determined by the present inventors, such these conventional features and other configuration aspects such as adjacency lists, may limit flexibility and hinder orchestration.

Embodiments herein providing for graph/table orchestration may uniquely support orchestration of graph operations with table operations using columnar stores. Some embodiments may improve orchestration by: (1) storing vertices and edges as collections of tables partitioned by type; and (2) implementing an orchestration layer that facilitates graph/table orchestrations on a variety of distributed execution engines, e.g., Apache Spark™, Hadoop® of Apache Software, GraphX™ of Apache Software, etc. Additionally, the improvements may involve supporting columnar stores with different storage characteristics, e.g., append-only stores such as Parquet of Apache Software, and updateable stores such as Cassandra of Apache Software, and so forth.

Advantageously, non-proprietary platforms or proprietary platforms are applicable, depending on the particular application and user requirements. Further, as indicated, the techniques may beneficially incorporate and support a variety of distributed execution engines, columnar stores, and so forth. In sum, certain embodiments provide users with a seamless or substantially seamless graph/table experience by storing vertices and edges as collections of tables in a columnar data store, and by implementing an orchestration layer that supports graph operations with table operations via choice of multiple distributed execution engines.

In some examples, vertices and edges are represented using one table per vertex type, and one table per edge type, rather than a single edge and vertex table. Vertex and edge properties are stored in separate columns in their respective tables to facilitate tabular operations on graph properties. In particular examples, a metadata repository keeps track of graph attributes (e.g., multi-graph), graph schema, the collection of tables that represent the graph, and the like. The system may also track the characteristics of the columnar store, e.g., append-only, updateable, indexing support, and so on.

The new orchestration layer may facilitate seamless or substantially seamless tabular and graph operation on multiple distributed table and graph execution engines. The orchestration layer may support operations on individual tables, or collections of vertex and edge tables, by creating (e.g., automatically) unioned views at runtime. The orchestration layer may also provide or accommodate different mechanisms for updating based on the characteristics of the columnar data store, such as with respect to indexing, compression, support for in-place edits, and so forth. Again, embodiments beneficially support graph/table operations on multiple distributed table and graph execution engines. Unlike the prior art, some present examples may also support columnar stores with different storage characteristics. Users may advantageously experience flexibility due to not being limited to specialized columnar or graph stores.

In embodiments, tables can be transformed into property graphs by adding metadata, for example, to a metadata repository that defines the columns that represent vertex identifications (IDs), edge IDs, edge labels, and vertex and edge properties. In contrast, a conventional approach of importing tables into Titan, for instance, can be a long cumbersome process. Conversely, with embodiments herein, the importing of tables may be a relatively straightforward process of recording metadata about the existing tables.

Further, the new technique of employing multiple tables, one per vertex or edge type, may promote efficient handling of relatively large heterogeneous graphs in distributed systems. For example, many queries operate on a single type of vertex and edge, and because the data is already partitioned by type, the technique is generally simpler to load only the columns needed into a distributed graph processing engine such as GraphX™ or Giraph™ of Apache Software. Moreover, for append-only columnar stores, partitioning the vertex and edge tables by type may reduce the amount of data that needs to be re-written. Quite the opposite, for the data conventionally stored in a single vertex and edge frame, the entire graph generally would be re-written when performing updates. GraphX™ is an example of a distributed resilient processing engine that uses a sequence of relational joins and aggregations that runs on Apache Spark™. Giraph™ is an example of a distributed graph processing engine that uses vertex-centric programming on Apache Hadoop®.

Additionally, the present embodiments for representing edges in multiple tables using edge lists, instead of adjacency lists, facilitates improved graph/table operations. This present format may make easier the partitioning across multiple machines. Further, "super nodes" or vertices with a very large number of connections, are commonly a problem with Graph data. Historically, systems employ adjacency lists, where adjacent vertices are stored next to the source vertex in a single row in the columnar store. However, as would be appreciated by one of ordinary skill in the art with benefit of the present disclosure, such conventional approaches can be challenging with respect to partitioning across multiple machines.

Lastly, the present new format of representing edges in multiple tables may be better than adjacency lists for streaming applications. In examples, appending to edge lists and vertex lists may be relatively conducive. In "Internet of Things" applications, for example, large amounts of data may be generally collected on a frequent basis including substantially continuously or constantly. Advantageously, the present embodiments of organizing data by "type" may make possible to collect many different streams of data while maintaining the ability to relate the data together.

FIG. 1 is a diagram of a computing device 100, such as a server. While FIG. 1 depicts one computing device 100, embodiments may employ multiple computing devices 100. Such devices 100 and systems may be servers, host devices, client devices, user interface devices, and so forth. The computing device 100 includes a processor 102, e.g., a central processing unit or CPU. The processor 102 may be multiple processors and/or each processor 102 may have multiple cores. The computing device 100 has memory 104, such as volatile memory (e.g., random access memory or RAM), non-volatile memory, and other types of memory. In the illustrated embodiment, the memory 104 stores logic or code 106 executable by the one or more processors 102.

The code 106 may be executable by the processor 102 to implement the embodiments discussed herein, such as orchestration of table operations with graph operations, related applications, and so on. Moreover, the executable code 106 may also include the graph query optimizer and in-memory distributed query execution engine discussed later in the present disclosure. Lastly, while FIG. 1 represents a device 100 such as server, the processor(s) 102 and memory 104 having the stored executable code 106 may instead or additionally be in a distributed computing system such as across multiple compute nodes.

Figure 2:
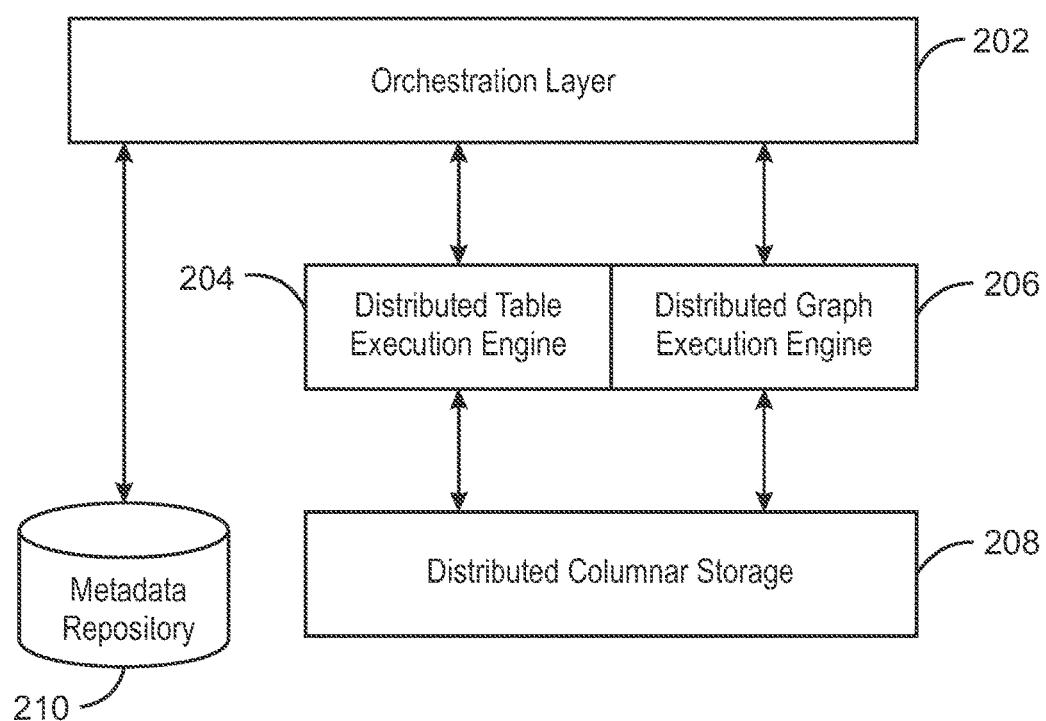
FIG. 2 is a diagram of an exemplary architecture for supporting graph operations with table operations in accordance with embodiments of the present techniques.

FIG. 2 is a diagram of an exemplary architecture 200 for supporting graph operations with table operations. Aspects of the various components may be modules or executable code, e.g., 106 of FIG. 1. The architecture 200 includes an orchestration layer 202 (e.g., again, including executable code 106 of FIG. 1) which may provide for a relatively seamless graph/table experience for the user. Certain embodiments of the orchestration layer 202 may promote such an experience by facilitating the use of multiple executions engines for a single set of data.

The illustrated embodiment includes a distributed table execution engine 204 (e.g., Spark™, Hadoop®, etc.) and a distributed graph execution engine 206 (e.g., GraphX, Giraph™, etc.). With the distributed table execution engine 204, table-like operations may be relatively naturally supported in execution engines 204 such as Apache Spark™, Apache Hadoop® (with Pig), and others. With the distributed graph execution engine 206, graph-oriented operations, including graph algorithms implemented on Pregel, or distributed Gremlin query in TinkerPop3, may be supported with graph execution engines 206 such as GraphX™ and Giraph™.

A metadata repository 210 may keep track of graph attributes, graph schema, and the collection of tables which represent the property graph. The repository 210 may also track the characteristics of the columnar store 208 that determine how the orchestration interacts with the columnar store in certain examples. The distributed columnar store 208 may provide at least two new techniques. The first is one table per vertex or edge "type," which may be specified by the "label," as discussed below. The second is employment of a general-purpose columnar store. In contrast, conventional graph/table solutions use special-purpose platforms that are not portable or deployable in a wide variety of environments. Additionally, customers may already have significant investments in an existing columnar stores, e.g., a 500-node Cassandra cluster.

The following five tables are an example of a property graph as a collection of vertex and edge tables. The first three tables are vertex tables. The last two tables are edge tables.

TABLE 1

Actor Table

| ID | Actor |
|---|---|
| 1 | Al Pacino |
| 2 | Jennifer Lawrence |
| 3 | Christian Bale |

TABLE 2

User Table

| ID | Username | Age |
|---|---|---|
| 1 | Alice | 21 |
| 2 | Bob | 42 |
| 3 | Tony | 32 |

TABLE 3

Movie Table

| ID | Movies |
|---|---|
| 1 | American Hustle |
| 2 | Scarface |

TABLE 4

Edge Table

| User ID | Movie ID | Rating |
|---|---|---|
| 1 | 1 | 4.5 |
| 1 | 2 | 2.5 |
| 3 | 2 | 5.0 |

TABLE 5

Edge Table

| Actor ID | Movie ID | Character |
|---|---|---|
| 2 | 1 | Irving Rosenfeld |
| 3 | 1 | Rosalyn Rosenfeld |
| 1 | 2 | Tony Montana |

The graph representation with respect to the above five example tables has the following features. First, one table per vertex or edge "type," which specified by the "label," which is a new technique to store a graph in tabular format. Conversely, conventional solutions using tabular storage store all vertices in one table and all edges in another table. Second, in embodiments herein, each "property" of an edge or vertex may be a "column" when the user operates on a graph as a table. Third, embodiments provide extra columns for special properties such as vertex IDs, and edge IDs. Such may be labeled or characterized as "system properties" or "system columns." Fourth, edges may be represented as an edge list instead of adjacency lists. Edge lists may be better suited to support seamless table/frame operations. Edge lists may be less space efficient than adjacency lists because the source vertex ID is generally repeated in each row. Embodiments herein may rely on compression techniques, such as dictionary encoding, to store columns in the edge list more efficiently. Fifth, in examples, streaming applications can append data to vertex and edge lists.

Further, with respect to above example Tables 1-5, in embodiments, data updates and deletion for append-only columnar data stores, such as Parquet, may be implemented by reading, transforming, and re-writing vertex and edge table(s). The updates and deletions may be performed in-place for columnar stores such as Cassandra which supports edits. Furthermore, the present orchestration system may automatically assign unique IDs to vertices and edges. Indeed, unioned views which may operate generally on vertices and nodes, may be implemented with globally unique IDs. Lastly, present design herein may take advantage of indexing provide by the columnar store. Indexing can facilitate enforcing uniqueness or speeding point queries and other table-like operations performed on the graph.

As for table execution, the table operations on graphs may take several forms. For example, the forms may involve working with a particular vertex type as a physical table and/or working with a particular edge type as a physical table. Other examples table operations on graphs may include a table as a unioned view, and involve working with multiple types of vertices as the table, working with multiple types of edges as the table, and/or working with multiple types of vertices and edges as the table.

A significant aspect of certain embodiments may be that physical tables can operated on as-is, or operations can be performed on unioned views of collections of tables created during runtime. In some embodiments, operations can be performed automatically on the collection of tables during runtime. In particular embodiments, vertex tables may get (e.g., automatically) system columns including, for example: _label and _vid. Similarly, in embodiments, edge tables may get (e.g., automatically) system columns including, for example: _label. _eid, _source_vid, and _dest_vid. With respect to table execution, Table 6 below list four exemplary categories of table operations that may be exposed on a graph. Exemplary orchestration implementations for the table operation categories are briefly noted. Of course, other categories not listed and/or orchestration implementations not noted, are applicable.

TABLE 6

Table Operation Categories

| Table Operation Category | Implementation for Graph/Table Orchestration |
|---|---|
| 1. Insert - Adding new vertices or edges. | Vertex IDs and/or Edge IDs assigned. IDs globally unique with a graph. |
| 2. Update - Adding/modifying existing vertices or edges. | Vertex IDs and Edge IDs not updateable. Labels and Properties can be modified, such as columns in a table. |
| 3. Delete | Deleting vertices also deletes the edges that connect to those vertices. |
| 4. Query/Export | Query supported on individual types, or by unioning types together to produce compound views. |

As for graph execution, embodiments may facilitate a relatively beneficial system and approach. For example, graph execution can be accomplished by unioning vertex tables with each other, and unioning edge tables with each other and the loading the data into a distributed graph processing engine, such as GraphX™ or other engines. Certain embodiments may offer innovation with Graph Execution when, for example, the user only wants to operate on vertices and/or edges of certain types. In other words, certain embodiments can respond to load only those desired types into the execution engine.

The discussion now turns to a related but new topic. Additional embodiments may provide for a graph query optimizer (e.g., as executable code 106 in FIG. 1) and in-memory distributed query execution engine.

Figure 3:
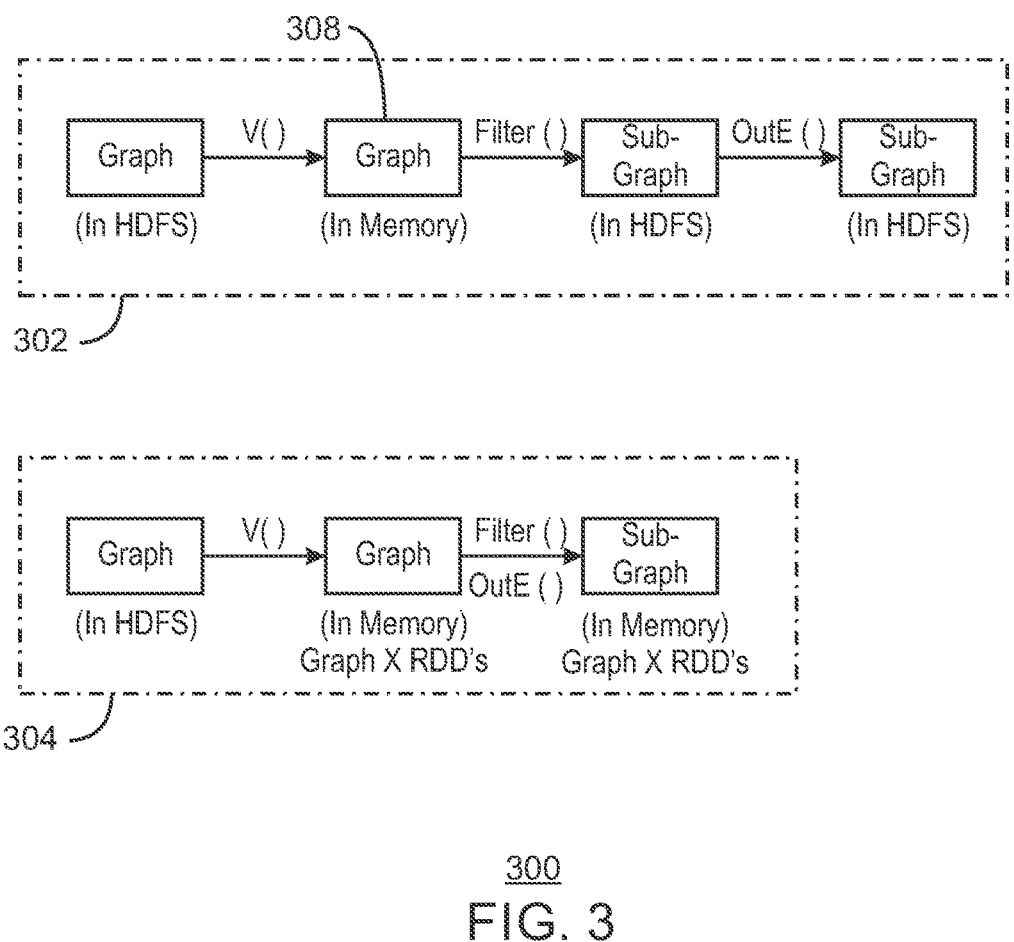
FIG. 3 is a diagram of a first execution path, and a second execution path in accordance with embodiments of the present techniques.

With respect to the query optimizer, embodiments employ a new technique to uniquely and opportunistically combine the chained operators in, for example, Gremlin (see e.g., FIG. 3). Thus, embodiments may improve or optimize graphs queries by combining operators. Such may facilitate to translate a chain of operations in the graph query to a lesser number of jobs as compared to, for example, Tinkerpop3 Gremlin implementation using Apache Giraph™ and MapReduce™.

As for in-memory distributed graph processing engine, a new graph query engine based on in-memory distributed graph processing engine may be provided, as discussed below. Such may facilitate the graph to be cached or always cached in memory and avoid serialization and deserialization of data between the different operations of the graph query in certain examples. The query execution alone may improve by as much as two times over traditional approaches.

Traversal-based graph query languages such as Gremlin, created by Aurelius Tinkerpop group, are increasingly becoming the de facto query language for graph databases such as Titan, Neo4j, and InfiniteGraph. However, these conventional implementations have had significant scalability limitations where the queues, for example, were executed within the scope of a single Java™ Virtual Machine unable to handle large graphs containing tens of billions of vertices and edges (terabytes in size). While there are conventional distributed query execution engines, such as Tinkerpop3 version of Gremlin, which uses a mix of Apache™ Giraph™ and MapReduce™ to execute graph queries in a distributed fashion, these conventional approaches suffer from at least two general drawbacks.

First, with respect to these historical approaches, the distributed query is based on MapReduce™ which is distributed, but uses files for inter-process communications. This means that between each stage of a multi-hop query such as "g.V( ).has("name", "Alice").outE( ).name" data are serialized and de-serialized to/from the underlying Hadoop Distributed File System (HDFS™). Such unfortunately may generally add significant input/output (I/O) overhead, which can be avoided if the intermediate data are kept in memory, as discussed below.

Second, traditionally in a chain of operators, each operator is typically mapped to, for example, either a Giraph™ job or MapReduce™ job. This may mean that the number of jobs varies linearly with the number of operators in the query which is sub-optimal. Conversely, embodiments herein provide that operators can be combined based on filter-first strategy or common vertex keys so that the number of jobs to execute the query can be reduced or minimized. In general, embodiments herein may address problems of conventional techniques and provide a distribution query execution engine that is relatively faster and in-memory.

Certain embodiments employ a distributed, in-memory graph engine, such as Apache Spark™ GraphX™, to execute the queries in combination with a query optimizer that may reduce the number of jobs required to process a traversal query. Embodiments may map the graph query operators of a graph traversal language, such as Gremlin to Spark™ GraphX™ operations, for example: outE→ edges( ), has("name", Alice)→filter(vertex→vertex. name="Alice"), and so on. Once the graph is loaded into the distributed data structure, subsequent query operations (e.g., all subsequent query operations) may run in memory and generally need not be serialized to disk. In an alternate instance, serialization may be implemented when the size of the subgraph, as a result of the query, exceeds the total memory capacity of the cluster of machine. If so, the subgraph may spill to the storage medium.

An important aspect may be the query optimizer. A procedural graph query language may appear as nested function cells. In conventional examples, such as with the Tinkerpop3 implementation of Gremlin, each query operator is mapped to either Giraph™ or MapReduce™ jobs. For instance, a query such as "g.V( ).has("name","Alice"). outE( ).name" is translated to three jobs, namely Filter, Traversal, and Reduce without the optimizer. In contrast, with some embodiments of the present techniques, such a query can be completed in two steps: Filter and Reduce where the outgoing edges are captured in the filter step. Indeed, certain embodiments may give an optimization technique that combines filters and outgoing edge operations and, hence, reduces or minimizes the total number of jobs to execute the query. Such is one example in the kinds of optimizations that may be achieved with the present techniques. Moreover, in particular examples, these new optimizations may be more effective because the solution runs an in-memory engine such as Apache™ Spark, rather than Giraph™ and MapReduce™.

Therefore, again, some embodiments may provide for a graph query optimizer and in-memory distributed query execution engine. The query optimizer may beneficially combine the chained operators to optimize graphs queries. In other words, the conventional chain of operations in the graph query may be translated to give a lesser number of jobs for the query. Moreover, a new graph query engine based on in-memory distributed graph processing engine may provide for the graph to be cached in memory to avoid serialization and deserialization of data between the different operations of the graph query in certain examples. The query execution time may decrease significantly.

Thus, certain embodiments beneficially provide for an in-memory Distributed Query Engine (DQE). Some embodiments may implement a distributed query engine in, for example, the Gremlin graph query language. In examples, vertex programs are mapped to the GraphX™ apply( ) functions and aggregate functions are mapped to map Vertices( ) and mapEdges( ) functions. In further examples, the sequence of operation in a query (e.g., a Gremlin query) after the mapping may appear as a sequence of operations (e.g., GraphX™ operations). Yet, unlike the conventional Tinkerpop3 Giraph™ implementation, for instance, the intermediate result of the sequence operations herein are not serialized via the underlying file system in some present embodiments. Instead, the sequence operations may be maintained in-memory.

Therefore, in present examples, completion time of the queries may be decreased significantly. Exemplary dataflows are presented in FIG. 3 for an example query: Query: g.V( ).has(name, Alice).outE( ).name. FIG. 3 is a graph query execution diagram 300 for the aforementioned example query, wherein the diagram 300 depicts for comparison a first execution path 302, such as via Gremlin with Giraph™, versus a second execution path 304, such as via a present optimizer on GraphX™. A graph box is denoted with the reference numeral 308.

The first execution path 302 may employ, for instance, Giraph™ plus MapReduce™. In contrast, the second execution path 304 may employ an optimizer according to embodiments herein, plus, for example, GraphX™. Thus, in addition to using an in-memory distributed graph processing engine, embodiments employ a new technique to opportunistically combine the chained operators, such as in Gremlin. Operation of the form Filter→Edge Operation→filter, as depicted for path 302, are instead combined to Filter+Edge Operation map Vertices( ) function, as depicted for path 304. This latter technique of path 304 is not trivial to perform in Giraph™+MapReduce engine because an edge operation such as groupBy can be a separate MapReduce™ job and not a Giraph™ job.

Lastly, in particular example analytics applications, such as with Intel® analytics toolkits which may use, for example, a Titan® graph database facilitating users to run ad hoc queries, the serializing of a graph with a billion vertices to Titan® may take on the order of ten hours, for instance. However, via the aforementioned embodiments, the time may be reduced by as much as an order of magnitude, such as down to 1-2 hours. The new graph query optimizer and the in-memory distributed query engine may provide relatively fast execution of queries, high scalability to handle large graphs and high query throughput. In addition, embodiments may improve the performance and manageability of analytic tools, as they may avoid Apache Giraph™ or MapReduce™ in certain instances to achieve high throughout. Instead, some embodiments may employ or continue to use, for example, Apache™ Spark™ GraphX™ library which in certain cases may be an integral part of the analytics toolkit. Due to these reasons and other reasons, the present techniques may offer significant advantages for analytic tools.

Figure 4:
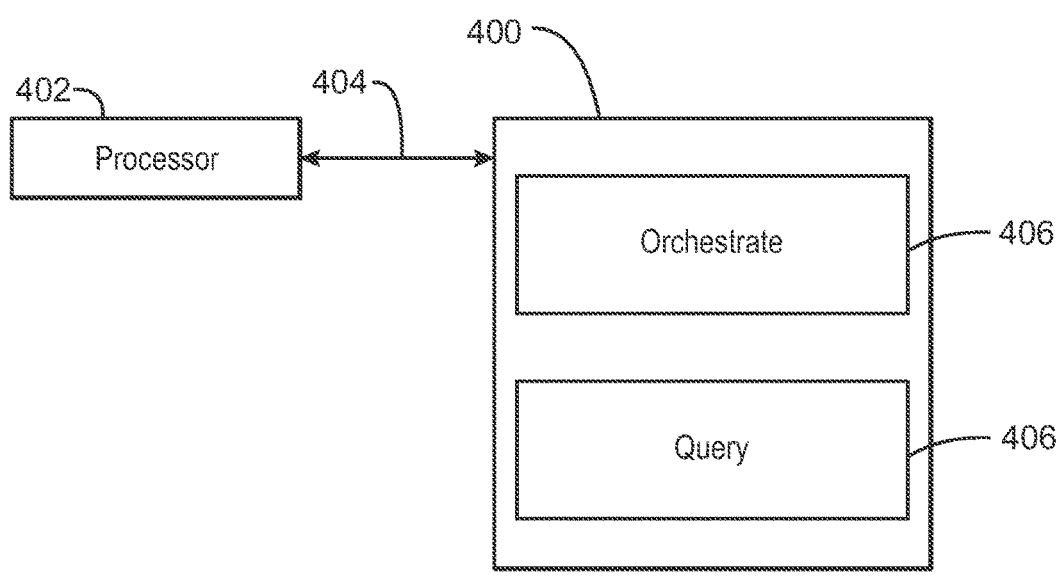
FIG. 4 is a block diagram illustrating a computer-readable medium to provide orchestration of graph operations with table operations, and query aspects, in accordance with embodiments of the present techniques.

FIG. 4 is a block diagram depicting an example of a tangible non-transitory, computer-readable medium 400 that can facilitate orchestration of table operations with graph operations. The computer-readable medium 400 may be accessed by a processor 402 over a computer interconnect 404. The processor 402 may be a server processor (e.g., 102), a compute node processor, or other processor. The tangible, non-transitory, computer-readable medium 400 may include executable instructions or code to direct the processor 402 to perform the operations of the techniques described herein.

Figure 5:
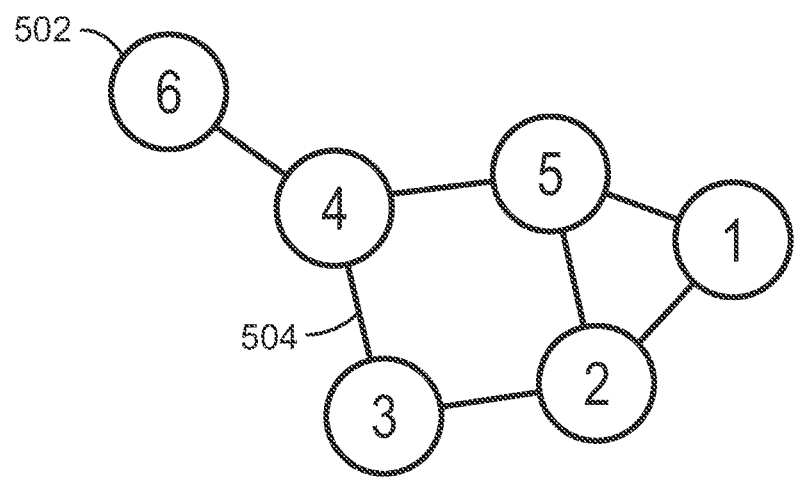
FIG. 5 is a diagrammatic representation of an exemplary graph format for data structures in data processing operations in a data store.

The various software components discussed herein may be stored on the tangible, non-transitory, computer-readable medium 400, as indicated in FIG. 4. For example, an adjustment module 406 (executable code/instructions) may direct the processor 402 to orchestrate graph/table operations. In another example, a query module 408, may direct the processor 402 to implement the aforementioned new query optimizer and in-memory execution engine. It should be understood that any number of additional software components not shown in FIG. 4 may be included within the tangible, non-transitory, computer-readable medium 400, depending on the application. FIG. 5 is a diagrammatical representation of an exemplary graph 500 format for data structures in data processing operations.

In mathematics and computer science, graph theory is the study of graphs, which may be mathematical structures used to model pairwise relations between objects. A "graph" (e.g., as represented by diagram 500) in this context may be made up of vertices 502 or nodes and lines called edges 504 that connect the vertices. A graph may be undirected, as depicted in FIG. 5, meaning that there is no distinction between the two vertices associated with each edge. In contrast, the graph may be directed, with the lines (representing the edges) having arrow heads (not shown). If so, the edges may be considered as directed from one vertex to another. Graphs are one of the prime objects of study in discrete mathematics.

FIG. 5 is a diagrammatic representation of an exemplary graph 500 format for data structures in data processing operations in a data store. In mathematics and computer science, graph theory is the study of graphs which are mathematical structures used to model pairwise relations between objects. A "graph" (e.g., as represented by diagram 500) in this context may be made up of vertices 502 or nodes, and lines called edges 504 that connect the vertices 502. A graph may be undirected, as depicted in FIG. 5, meaning that there is no distinction between the two vertices 502 associated with each edge 504. In contrast, the graph may instead be directed, with the lines (representing edges 504) having arrowheads. In general, a graph, G=(V, E) may be a collection of two sets, a set of vertices 502 and a set of edges 504. A property graph is a type of graph where vertices and edges have labels, and attributes. For example, a social network can be modeled as a property graph where each vertex represents a person with attributes like name, age, and gender; while an edge between two vertices represents a friendship. The friendship edge can have attributes like date of creation, and frequency of interaction.

In the description and claims, the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment", "one embodiment", "some embodiments", "various embodiments", or "other embodiments" means that a particular feature, structure, or characteristic described in connection with the embodiments is included in at least some embodiments, but not necessarily all embodiments, of the present techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can", or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Examples are provided. Example 1 is ab apparatus (e.g., computing device for data processing) for processing data in a data store. The apparatus includes a processor, and memory storing code executable by the processor to orchestrate a table operation of data with a graph operation of the data using columnar stores. To orchestrate includes storing vertices and edges as collections of tables by type, and supporting the columnar stores with different storage characteristics.

Example 2 incorporates the subject matter of Example 1. In this example, the computing device employs a plurality of distributed execution engines to orchestrate the table operation with the graph operation.

Example 3 incorporates the subject matter of any combination of Examples 1-2. In this example, the columnar stores have append-only stores or updateable stores, or both.

Example 4 incorporates the subject matter of any combination of Examples 1-3. In this example, to store vertices includes to store the vertices in multiple tables representing one table per vertex type.

Example 5 incorporates the subject matter of any combination of Examples 1-4. In this example, to store edges includes to store the edges in multiple tables representing one table per edge type.

Example 6 incorporates the subject matter of any combination of Examples 1-5. In this example, to orchestrate includes tracking, via a metadata repository, aspects of a graph associated with the graph operation, the aspects including graph attributes, graph schema, and the collection of tables that represent the graph.

Example 7 incorporates the subject matter of any combination of Examples 1-6. In this example, to orchestrate includes tracking the different storage characteristics of the columnar stores using a metadata repository.

Example 8 incorporates the subject matter of any combination of Examples 1-7. In this example, the different storage characteristics include append-only, updateable, or indexing support, or any combination thereof.

Example 9 incorporates the subject matter of any combination of Examples 1-8. In this example, to orchestrate includes to facilitate tabular and graph operations on multiple engines for distributed table and graph execution.

Example 10 incorporates the subject matter of any combination of Examples 1-9. In this example, to orchestrate includes to perform operations on individual tables, and on collections of vertex and edge tables by creating unioned views at runtime.

Example 11 incorporates the subject matter of any combination of Examples 1-10. In this example, to orchestrate includes implementing multiple mechanisms for updating the data, the multiple mechanisms correlative with the different storage characteristics of the columnar data stores.

Example 12 incorporates the subject matter of any combination of Examples 1-11. In this example, the multiple mechanisms include indexing, compression, and support for in-place edits.

Example 13 incorporates the subject matter of any combination of Examples 1-12. In this example, the code is executable by the processor to implement a graph query optimizer that combines chained operators of a graph query, and to perform the graph query having combined chain operators via an in-memory distributed query execution engine.

Example 14 incorporates the subject matter of any combination of Examples 1-13. In this example, to perform the graph query includes caching a graph associated with the graph query in memory to avoid serialization and deserialization of data between different operations of the graph query.

Example 15 incorporates the subject matter of any combination of Examples 1-14. In this example, to combine chained operators comprises translating the chained operators to reduce a number of jobs to execute the query.

Example 16 is a method of graph operations, including processing data via a processor. The method includes orchestrating, via the processor and an orchestration layer, a table operation of the data with a graph operation of the data using columnar stores. The orchestrating includes storing vertices and edges as collections of tables by type, and supporting the columnar stores with different storage characteristics.

Example 17 incorporates the subject matter of Examples 16. In this example, orchestrating includes employing multiple distribution execution engines.

Example 18 incorporates the subject matter of any combination of Examples 16-17. In this example, the columnar stores include append-only stores or updateable stores, or both.

Example 19 incorporates the subject matter of any combination of Examples 16-18. In this example, storing vertices includes storing the vertices in multiple tables, and representing one table per vertex type.

Example 20 incorporates the subject matter of any combination of Examples 16-19. In this example, storing edges includes storing the edges in multiple tables, and representing one table per edge type.

Example 21 incorporates the subject matter of any combination of Examples 16-20. In this example, orchestrating includes tracking, via a metadata repository, aspects of a graph associated with the graph operation, the aspects comprising graph attributes, graph schema, and the collection of tables that represent the graph.

Example 22 incorporates the subject matter of any combination of Examples 16-21. In this example, orchestrating includes tracking the different storage characteristics of the columnar stores using a metadata repository.

Example 23 incorporates the subject matter of any combination of Examples 16-22. In this example, the different storage characteristics comprise append-only, updateable, or indexing support, or any combination thereof.

Example 24 incorporates the subject matter of any combination of Examples 16-23. In this example, the orchestration layer facilitates tabular and graph operations on multiple engines for distributed table and graph execution.

Example 25 incorporates the subject matter of any combination of Examples 16-24. In this example, the orchestration layer supports operations on individual tables, and on collections of vertex and edge tables by creating unioned views at runtime.

Example 26 incorporates the subject matter of any combination of Examples 16-25. In this example, the orchestration layer facilitates multiple mechanisms for updating the data, the multiple mechanisms correlative with the different storage characteristics of the columnar data stores.

Example 27 incorporates the subject matter of any combination of Examples 16-26. In this example, the multiple mechanisms comprise indexing, compression, and support for in-place edits.

Example 28 incorporates the subject matter of any combination of Examples 16-27. In this example, the method includes implementing, via the processor, a graph query optimizer combining chained operators of a graph query, and wherein processing the data includes performing the graph query having combined chain operators on the data via an in-memory distributed query execution engine.

Example 29 incorporates the subject matter of any combination of Examples 16-28. In this example, performing the graph query includes caching a graph associated with the graph query in memory to avoid serialization and deserialization of data between different operations of the graph query.

Example 30 incorporates the subject matter of any combination of Examples 16-29. In this example, combining chained operators includes translating the chained operators to reduce a number of jobs to execute the query.

Example 31 is a tangible, non-transitory, computer-readable medium having code to direct a processor to process data, and to orchestrate a table operation of the data with a graph operation of the data using columnar stores. Further, orchestrate includes to store vertices and edges as collections of tables by type, and to support the columnar stores with different storage characteristics.

Example 32 incorporates the subject matter of Example 31. In this example, orchestrate includes to employ multiple distributed execution engines.

Example 33 incorporates the subject matter of any combination of Examples 31-32. In this example, the columnar stores include append-only stores or updateable stores, or both.

Example 34 incorporates the subject matter of any combination of Examples 31-33. In this example, to store vertices includes to store the vertices in multiple tables, and to represent one table per vertex type.

Example 35 incorporates the subject matter of any combination of Examples 31-34. In this example, to store edges includes to store the edges in multiple tables, and to represent one table per edge type.

Example 36 incorporates the subject matter of any combination of Examples 31-35. In this example, to orchestrate includes tracking, via a metadata repository, aspects of a graph associated with the graph operation, the aspects including graph attributes, graph schema, and the collection of tables that represent the graph.

Example 37 incorporates the subject matter of any combination of Examples 31-36. In this example, to orchestrate includes tracking the different storage characteristics of the columnar stores using a metadata repository.

Example 38 incorporates the subject matter of any combination of Examples 31-37. In this example, the different storage characteristics include append-only, updateable, or indexing support, or any combination thereof.

Example 39 incorporates the subject matter of any combination of Examples 31-38. In this example, to orchestrate includes to facilitate tabular and graph operations on multiple engines for distributed table and graph execution.

Example 40 incorporates the subject matter of any combination of Examples 31-39. In this example, to orchestrate includes to perform operations on individual tables, and on collections of vertex and edge tables by creating unioned views at runtime.

Example 41 incorporates the subject matter of any combination of Examples 31-40. In this example, to orchestrate includes implementing multiple mechanisms for updating the data, the multiple mechanisms correlative with the different storage characteristics of the columnar data stores.

Example 42 incorporates the subject matter of any combination of Examples 31-41. In this example, the multiple mechanisms include indexing, compression, and support for in-place edits.

Example 43 incorporates the subject matter of any combination of Examples 31-42. In this example, the code to direct the processor to implement a graph query optimizer that combines chained operators of a graph query, and the code to direct the processor to perform the graph query having combined chain operators via an in-memory distributed query execution engine.

Example 44 incorporates the subject matter of any combination of Examples 31-43. In this example, to perform the graph query includes caching a graph associated with the graph query in memory to avoid serialization and deserialization of data between different operations of the graph query.

Example 45 incorporates the subject matter of any combination of Examples 31-44. In this example, to combine chained operators includes translating the chained operators to reduce a number of jobs to execute the query.

Example 46 is a method including implementing, via a processor, a graph query optimizer that combining chained operators of a graph query. The method includes performing, via the processor and an in-memory distributed query execution engine, the graph query having combined chain operators.

Example 47 incorporates the subject matter of Example 46. In this example, performing the graph query includes caching a graph associated with the graph query in memory to avoid serialization and deserialization of data between different operations of the graph query.

Example 48 incorporates the subject matter of any combination of Examples 46 and 47. In this example, combining chained operators includes translating the chained operators to reduce a number of jobs to execute the query.

Example 49 is an apparatus for graph operations, the apparatus including means for processing data. Further, the apparatus includes means for orchestrating a table operation of the data with a graph operation of the data using columnar stores. The means for orchestrating includes means for storing vertices and edges as collections of tables by type, and means for supporting the columnar stores with different storage characteristics.

Example 50 incorporates the subject matter of Example 49. In this example, the means for orchestrating includes means for employing multiple distribution execution engines.

Example 51 incorporates the subject matter of any combination of Examples 49-50. In this example, the columnar stores include append-only stores or updateable stores, or both.

Example 52 incorporates the subject matter of any combination of Examples 49-51. In this example, the means for storing vertices and edges includes means for storing the vertices in multiple tables, representing one table per vertex type.

Example 53 incorporates the subject matter of any combination of Examples 49-52. In this example, the means for storing vertices and edges includes means for storing the edges in multiple tables, representing one table per edge type.

Example 54 incorporates the subject matter of any combination of Examples 49-53. In this example, the means for orchestrating include means for tracking metadata of a graph associated with the graph operation, the metadata including graph attributes, graph schema, and graph aspects of the collection of tables that represent the graph.

Example 55 incorporates the subject matter of any combination of Examples 49-54. In this example, the means for orchestrating includes means for tracking the different storage characteristics of the columnar stores using metadata.

Example 56 incorporates the subject matter of any combination of Examples 49-55. In this example, the different storage characteristics include append-only, updateable, or indexing support, or any combination thereof.

Example 57 incorporates the subject matter of any combination of Examples 49-56. In this example, the means for orchestrating facilitates tabular and graph operations on multiple engines for distributed table and graph execution.

Example 58 incorporates the subject matter of any combination of Examples 49-57. In this example, the means for orchestrating supports operations on individual tables, and on collections of vertex and edge tables by creating unioned views at runtime.

Example 59 incorporates the subject matter of any combination of Examples 49-58. In this example, the means for orchestrating facilitates multiple mechanisms for updating the data, the multiple mechanisms correlative with the different storage characteristics of the columnar data stores.

Example 60 incorporates the subject matter of any combination of Examples 49-59. In this example, the multiple mechanisms include indexing, compression, and support for in-place edits.

Example 61 incorporates the subject matter of any combination of Examples 49-60. In this example, the apparatus includes means for implementing a graph query optimizer combining chained operators of a graph query, and wherein the means for processing the data includes means for performing the graph query having combined chain operators on the data via an in-memory distributed query execution engine.

Example 62 incorporates the subject matter of any combination of Examples 49-61. In this example, the means for performing the graph query includes means for caching a graph associated with the graph query in memory to avoid serialization and deserialization of data between different operations of the graph query.

Example 63 incorporates the subject matter of any combination of Examples 49-62. In this example, combining chained operators includes translating the chained operators to reduce a number of jobs to execute the query.

Example 64 is an apparatus for graph operations. The apparatus includes means for implementing a graph query optimizer combining chained operators of a graph query. The apparatus includes means for performing the graph query having combined chain operators on data via an in-memory distributed query execution engine.

Example 65 incorporates the subject matter of Example 64. In this example, the means for performing the graph query includes means for caching a graph associated with the graph query in memory to avoid serialization and deserialization of data between different operations of the graph query.

Example 66 incorporates the subject matter of any combination of claims 64 and 65. In this example, combining chained operators includes translating the chained operators to reduce a number of jobs to execute the query.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for processing data in a data store, comprising:
a processor; and
memory storing code executable by the processor to:
orchestrate a table operation of data with a graph operation of the data using columnar stores, comprising to:
store vertices and edges as collections of tables by type in one or more of the columnar stores, comprising to store the vertices in multiple tables representing one table per vertex type and to store edges with edge attributes in multiple tables representing one table per edge type;
support the columnar stores with different storage characteristics; and
orchestrate the table operation of the data with the graph operation of the data on a plurality of distributed execution engines; and
implement on the data a graph query optimizer that combines chained operators of a graph query to reduce total number of jobs to execute the graph query, the graph query optimizer to combine a first chained operator comprising a filter with a second chained operator comprising an edge operation into a single chained operator, wherein the edge operation is captured in the filter.

2. The apparatus of claim 1, wherein to orchestrate comprises to:
employ the plurality of distributed execution engines; and
provide for evaluation of a dataset both as a graph and as a table without import or export between storage systems.

3. The apparatus of claim 1, wherein the columnar stores comprise append-only stores, or updateable stores, or both.

4. The apparatus of claim 1, wherein the graph operation comprises to union vertex tables and to union edge tables.

5. The apparatus of claim 1, wherein the code is executable by the processor to perform the graph query having combined chain operators via an in-memory distributed query execution engine, and wherein the graph query optimizer combines the chained operators based on a filter-first strategy.

6. A method of graph operations, comprising:
processing data via a processor of a computing device;
orchestrating, via the processor and an orchestration layer of the computing device, a table operation of the data with a graph operation of the data using columnar stores, the orchestrating comprising:
storing vertices and edges as collections of tables by type in one or more of the columnar stores, comprising storing the vertices in multiple tables representing one table per vertex type and storing the edges with edge attributes in multiple tables representing one table per edge type;
supporting the columnar stores with different storage characteristics; and
orchestrating the table operation of the data with the graph operation of the data on a plurality of distributed execution engines; and
implementing on the data, via the processor, a graph query optimizer that combines chained operators of a graph query to reduce total number of jobs to execute the graph query, the graph query optimizer to combine a first chained operator comprising a filter with a second chained operator comprising an edge operation into a single chained operator, wherein the edge operation is captured in the filter.

7. The method of claim 6, wherein orchestrating comprises employing the plurality of distribution execution engines, and wherein the graph operation comprises to union vertex tables and to union edge tables, and to load the data in a distributed graph processing engine.

8. The method of claim 6, wherein the orchestration layer provides for evaluation of a dataset both as a graph and as a table without import or export between storage systems.

9. The method of claim 6, wherein orchestrating comprises tracking the different storage characteristics of the columnar stores using a metadata repository.

10. The method of claim 6, wherein the orchestration layer facilitates tabular and graph operations on multiple engines for distributed table and graph execution.

11. The method of claim 6, wherein the orchestration layer supports operations on individual tables, and on collections of vertex and edge tables by creating unioned views at runtime.

12. The method of claim 6, wherein the orchestration layer facilitates multiple mechanisms for updating the data, the multiple mechanisms correlative with the different storage characteristics of the columnar data stores, wherein the multiple mechanisms comprise indexing, compression, and support for in-place edits.

13. The method of claim 6, wherein processing the data comprises performing the graph query having combined chain operators on the data via an in-memory distributed query execution engine.

14. A tangible, non-transitory, computer-readable medium comprising code to direct a processor to:
process data;
orchestrate a table operation of the data with a graph operation of the data using columnar stores, comprising to:
store vertices and edges as collections of tables by type in one or more of the columnar stores, comprising to store the vertices in multiple tables representing one table per vertex type, and to store edges with edge attributes in multiple tables representing one table per edge type;
support the columnar stores with different storage characteristics; and
orchestrate the table operation of the data with the graph operation of the data on a plurality of distributed execution engines; and
implement on the data a graph query optimizer that combines chained operators of a graph query to reduce total number of jobs to execute the graph query, the graph query optimizer to combine a first chained operator comprising a filter with a second chained operator comprising an edge operation into a single chained operator, wherein the edge operation is captured in the filter.

15. The tangible, non-transitory, computer-readable medium of claim 14, wherein the columnar stores comprise append-only stores, or updateable stores, or both.

16. The tangible, non-transitory, computer-readable medium of claim 14, comprising code to direct the processor to:
partition table operations and graph operations across multiple machines; and
perform the graph query having combined chain operators via an in-memory distributed query execution engine.

17. The method of claim 6, wherein performing the graph query comprises caching a graph associated with the graph query in memory to avoid serialization and deserialization of data between different operations of the graph query.

18. The method of claim 6, wherein the graph query optimizer combines the chained operators based on a filter-first strategy.

19. The method of claim 6, wherein the columnar stores comprise append-only stores, or updateable stores, or both.

20. The apparatus of claim 1, wherein the plurality of distributed execution engines includes a distributed table execution engine and a distributed graph execution engine.

21. The apparatus of claim 1, wherein to implement the graph query optimizer comprises to cache in memory a graph associated with the graph query to avoid serialization and deserialization of data between different operations of the graph query.

22. The apparatus of claim 1, wherein the columnar stores to store vertices and edges as collections of tables.

23. The apparatus of claim 1, wherein the orchestrate to receive metadata into a repository that defines columns representing property graphs to transform tables comprising the columns into the property graphs, the metadata defining vertex identifications (IDs), edge IDs, edge labels, vertex properties, and edge properties.

24. The tangible, non-transitory, computer-readable medium of claim 14, comprising code to direct the processor to cache in memory a graph associated with the graph query to avoid serialization and deserialization of data between different operations of the graph query.

25. The tangible, non-transitory, computer-readable medium of claim 14, comprising code to direct the processor to store in one or more of the columnar stores vertices and edges as collections of tables.

* * * * *